United States Patent [19]
Dorner et al.

[11] 3,828,651
[45] Aug. 13, 1974

[54] COLUMN OF ADJUSTABLE LENGTH

[75] Inventors: Nikolaus Dorner, Koblenz-Karthause; Herbert Freitag, Koblenz-Lutzel, both of Germany

[73] Assignee: Stabilus Industrie Und Handelsgesellschaft GmbH, Koblenz-Neuendorf, Germany

[22] Filed: Sept. 27, 1972

[21] Appl. No.: 292,814

Related U.S. Application Data

[63] Continuation of Ser. No. 777,768, Nov. 21, 1968, abandoned.

[52] U.S. Cl.......................... 91/416, 91/422, 92/110, 248/188.2, 248/400, 188/300
[51] Int. Cl............................................ F15b 15/17
[58] Field of Search........ 91/416, 422; 248/400, 44, 248/354 H, 188.2, 354 R; 188/300; 267/65 R, 65 D

[56] References Cited
UNITED STATES PATENTS

| | | | |
|---|---|---|---|
| 2,446,127 | 7/1948 | Cramer | 248/400 |
| 3,388,883 | 6/1968 | Axthammer et al. | 248/188.2 |
| 3,447,645 | 6/1969 | Dorner et al. | 248/354 R |

*Primary Examiner*—Paul E. Maslousky
*Attorney, Agent, or Firm*—Kurt Kelman; Hans Berman

[57] ABSTRACT

A column of adjustable length for use as a table leg or the like having a cylinder, a piston movable in the cylinder, a hollow piston rod attached to the piston and axially projecting from the cylinder, and an operating rod axially slidable in the piston rod with ample clearance for operating a first valve which connects the two cylinder compartments on opposite axial sides of the piston is additionally equipped with a second valve which connects one of the compartments with the atmosphere through the clearance space in the piston rod when the operating rod is displaced axially beyond the distance required for operating the first valve.

13 Claims, 3 Drawing Figures

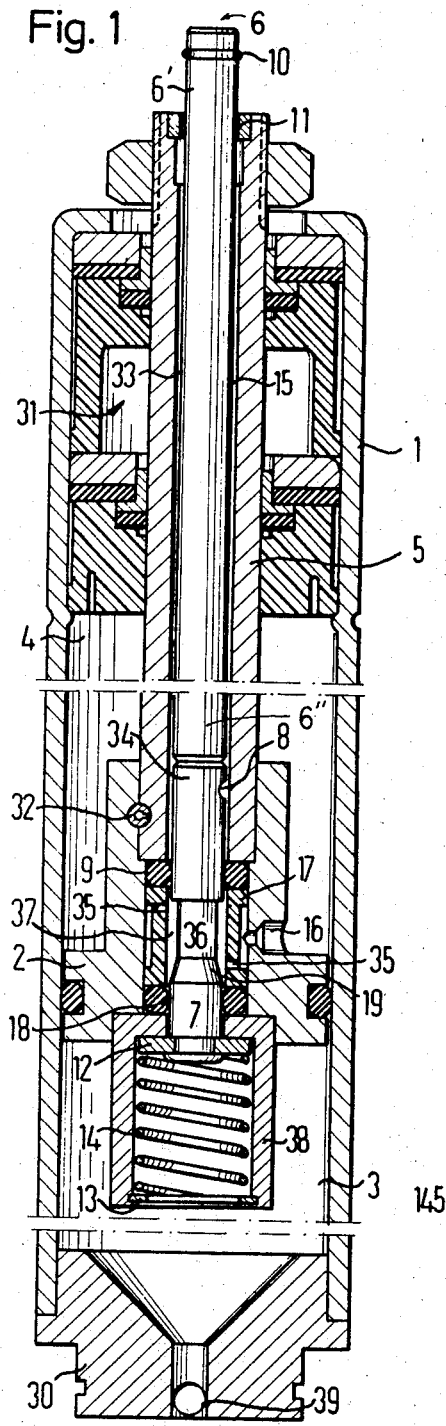

3,828,651

1

COLUMN OF ADJUSTABLE LENGTH

This application is a continuation of the copending application Ser. No. 777,768 filed on Nov. 21, 1968, and now abandoned.

This invention relates to columns of adjustable length, and particularly to an improvement in the adjusting mechanism for such a column.

Tables, particularly drafting tables, other pieces of furniture, and like devices have been equipped heretofore with adjustable columns in which a piston divides the normally sealed cavity in a cylinder into two compartments, a piston rod projects from the piston axially through an end wall of the cylinder, and either the cylinder or piston rod are attached to a table top or other element whose vertical position is to be adjusted, while the other portion of the column stands on the ground. When the cylinder compartments are filled with a fluid under adequate pressure, the length of the column is fixed until a valve connecting the compartments is opened. It has been proposed heretofore to make the piston rod hollow or tubular, and to install the operating member for the afore-described valve in the bore of the piston rod.

The known devices usually require a filling nipple for admitting a fluid to the cylinder cavity and the fluid may be partly released through the opened nipple if it is desired to reduce the internal fluid pressure. Without such fluid release, it may become very difficult to reduce the column to its minimum design length. The known arrangement is relatively costly because of the need for providing a nipple and a releasable closure for the same which is capable of being operated without special tools. It is difficult to close the nipple at the precise internal pressure desired, and the nipple normally detracts from the decorative appearance of the column.

The primary object of the invention is the provision of a column of adjustable length of the general type described above whose internal working pressure may be reduced with great precision by the ultimate consumer in a very simple manner by means of a valve mechanism which can be manufactured at low cost, and which is invisible in the installed condition of the column.

It is a concomitant object of the invention to provide a column which may be charged by the manufacturer with fluid at high pressure, close to the maximum pressure permissible with the available enclosing cylinder, seals, and other elements of the column, and can be delivered to the consumer with its highly pressurized charge. The ultimate consumer may then reduce the pressure as needed to suit a specific application.

With these and other objects in view, as will hereinafter become apparent, the invention provides an improvement for an adjustable column of the known type which includes a cylinder defining therein a normally closed cavity, and a piston axially movable in the cavity and axially dividing the same into two compartments. A piston rod attached to the piston extends axially through one of the compartments and outward of the cavity in sealing engagement with the cylinder. The piston rod is formed with an axially elongated bore whose outer axially terminal portion is open to the ambient atmosphere. An operating member is axially movable in the bore and is connected with a valve for moving the latter between first and second respective positions in which the valve connects the cylinder compartments and seals the compartments from each other when the operating rod moves between first and second axial positions.

The improvement according to the instant invention comprises a second valve which is operatively interposed between one of the cylinder compartments and the afore-mentioned terminal portion of the piston rod bore. A motion transmitting means connects the operating member and the second valve in such a manner that the operating member, by moving from its second axial position to a third position away from the first axial position, opens the second valve and thereby opens the one cylinder compartment to the atmosphere.

In order to prevent accidental release of pressure fluid from the column, we prefer to provide a blocking device which normally blocks movement of the operating member from its second to its third position, such as two cooperating abutments one of them releasable, on the operating member and the enveloping piston rod. The most convenient location for these abutments is near the orifice of the piston rod bore so that the releasable abutment is readily accessible from outside the cylinder cavity in the assembled column.

In its preferred form, the apparatus of the invention is equipped with valves whose movable members are secured to the operating member for axial movement therewith, and corresponding valve seats secured to the piston rod, the two valve members being axially spaced.

Other features, additional objects, and many of the attendant advantages of this invention will readily be appreciated as the same becomes better understood from the following detailed description of preferred embodiments when considered in connection with the appended drawing, in which:

FIG. 1 shows a first column of the invention in section on its longitudinal axis, portions of the column being broken away for the convenience of pictorial representation.

FIG. 2 shows another embodiment of the invention in a view corresponding to that of FIG. 1; and FIG. 3 shows a modification of a detail of the apparatus of FIG. 1.

Referring now to the drawing in detail, and initially to FIG. 1, there is seen a column of the invention whose basic features are known. A slender cylinder 1 contains a piston 2 which axially divides the cylinder cavity into a lower compartment 3 and an upper compartment 4. A tubular piston rod 5 extends from the piston 2 through the compartment 4 and axially outward of the cylinder cavity into the ambient atmosphere.

The bore 15 of the piston rod 5 slidably receives a rod 6 with ample radial clearance. The piston 2 has an upwardly projecting tubular hub portion in which the lower end of the piston rod 5 is secured by a locking pin 32. Respective axial portions of the rod 6 extend beyond the piston rod 5 through the hub portion and the main portion of the piston 2 into the compartment 3 and through the orifice of the bore 15 into the atmosphere.

The axial portion 6' of the rod 6, which partly projects from the bore 15, serves as a valve operating member, and its axial motion inward and outward of the bore is transmitted by an integral portion 6'' of the rod 6 to an axial portion 34 of the rod 6 which is received in the piston hub in the normal operating position of the column seen in FIG. 1, has a notch 8 in its otherwise cylindrical surface, and constitutes a movable valve member, as will presently become apparent. It is followed in axial sequence by a rod portion 36 of reduced diameter, by a conically flaring portion 19, and by a cylindrical end portion 7 which also constitutes a movable valve member.

The bore of the piston 2 under the lower end of the piston rod 5 accomodates, in axial sequence, a resilient ring 9, a flanged sleeve 17, and another resilient ring 18. The rings 9, 18 provide valve seats for the valve members 34, 7, and sealingly engage the associated movable valve members in the illustrated operating position of the column. The rings 9, 18 and the sleeve 17 are held in axially abutting engagement between the annular end face of the piston rod 5 and the centrally apertured bottom of a spring cage 38 having the shape of an inverted cup and fixedly attached to the piston 2. The valve member 7 extends downward through the bottom of the cage 38 and carries a washer 12 in the cage. The washer is pressed against the cage bottom by a helical compression spring 14 interposed between the washer 12 and a retaining ring 13 on the rim of the cage 38. The spring 14 thus normally holds the operating rod 6 in the illustrated position.

The operating end of the rod 6 which projects from the terminal portion of the piston rod 5 outside the cylinder 1, is equipped with a spring clip or ring 10 releasably fastened to the rod 6 by means of an annular groove of the rod 6. The ring 10 constitutes an abutment which cooperates with a fixedly fastened ring 11 on the piston rod 5 in the bore 15 of the latter to block axial movement of the rod 6 inward of the cylinder cavity against the restraint of the spring 14.

An elaborate annular seal 31, not itself relevant to the invention, is mounted in the topmost portion of the cylinder 1 about the piston rod 5 to prevent escape of fluid from the cylinder cavity over extended periods of time even if the internal pressure in the cylinder exceeds ambient atmospheric pressure by several atmospheres, as is normally required for operation of a column of the invention. The seal 31 permits the piston rod 5 to be moved axially into and out of the cylinder 1 without much friction. The opposite axial end of the cylinder 1 is normally sealed by a plug 30 provided with a ball-shaped check valve 39 which is held in its illustrated sealing position by the pressure of the fluid in the cylinder 1, as is conventional, and has not been illustrated in detail.

The dimensions of the generally cylindrical sleeve 17 are such that it defines an inner annular chamber 37 with the rod portions 36, 19 in the normal condition of the column, and an axially coextensive outer annular chamber with the inner axial wall of the piston 2. The two chambers communicate through radial bores 35 in both axial ends of the sleeve 17, and the outer chamber further is connected with the upper cylinder compartment 4 by a radial bore 16 in the piston 2.

The adjustable column shown in FIG. 1 is operated as follows:

When it is desired to change the effective length of the column, the operating member 6' of the rod 6 is pushed manually into the cylinder 1 as far as the abutting rings 10, 11 permit to reach a second, non-illustrated position of the rod 6. The valve member 7 is thereby pushed out of the valve seat 18 and far enough into the cage 38 to locate the reduced rod portion 36 and the conical rod portion 19 in the bore of the seat 18.

If the column was in a stable condition prior to the displacement of the valve operating member 6' the axial forces acting on the piston 2 in the compartments 3, 4 were equal. The effective surface area of the piston 2 in the compartment 3 is greater than the effective piston face area in the compartment 4, and the fluid pressure in the lower compartment 3 is therefore lower than the fluid pressure in the upper compartment 4 under equilibrium conditions.

When the member 6' of the operating rod 6 is pressed inward of the cylinder 1 as described above, the movement is transmitted to the valve members 7, 34, by the rod portion 6'', a flow channel is opened from the compartment 4 through the bore 16, the outer annular chamber about the sleeve 17, the lower bore 35, in the sleeve, and through the valve seat 18 into the lower compartment 3. Fluid tends to flow between the compartments until the pressure is equalized. When the valve operating member 6' is released for return to its illustrated position by the spring 14, the two compartments 3 and 4 are again separated from each other, and the greater force exerted by the fluid on the piston 2 in the compartment 3 drives the piston 2 and the piston rod 5 upward and outward of the cylinder 1 until equilibrium is again established.

The internal pressure in the cylinder 1 is normally more than adequate to expel the piston rod 5 from the cylinder 1 against the frictional resistance of the seal 31 until the hub portion of the piston 2 abuts against the seal 31. If it is desired to shorten the column, the piston rod 5 is pushed inward of the cylinder 1 while the valve seat 18 is open. The force applied manually or otherwise to the piston rod 5 is opposed by the internal fluid pressure in the cylinder 1. When this force is very great, it may not be convenient nor even possible to shorten the column as far as may be needed for a specific application.

In this instance, the spring clip or ring 10 which normally blocks rod movement by engagement with the ring 11, is removed from the valve operating member 6' and the rod 6 is pushed inward of the cylinder 1 in the bore 15 of the piston rod 5 until the turns of the spring 14 abut against each other, and further axial movement of the rod 6 becomes impossible. In the resulting third position of the rod 6, the notch 8 in the valve member 34 bridges the valve seat 9, and compressed fluid is permitted to escape from the upper compartment 4 through the bore 16, in the piston 2, the upper radial bore 35 in the sleeve 17, the notch 8, and the annular clearance space between the rods 5 and 6 in the bore 15 into the atmosphere. The rings 10 and 11 are dimensioned not to interfere with the flow.

When adjusted for suitable gas content in the cylinder 1 and gas distribution between the compartments 3 and 4, the column is placed between an element to be carried thereon and a support, the piston rod 5, for example, being fastened to the top of a table, and the plug 3 standing on the ground. The weight of the supported load may cause the column to be shortened slightly, and the column will thereafter maintain its length until the valve operating member 6' is again used for opening one of the two valve arrangements. The check valve 39 is conveniently employed for originally charging the cylinder 1 to its full pressure capacity with compressed air or nitrogen at the plant at which the column is manufactured, but need not be used by the ultimate consumer. The valve 39 may also be used for replenishing the gas charge, but replenishing gas may also be introduced through the open upper end of the bore 15 by means of a fitting sealingly engaging the piston rod 5, while the second valve is open at 8, 9.

The modified column illustrated in FIG. 2 is closely similar to the apparatus shown in FIG. 1, and identical in external appearance. It differs from the first-described embodiment of the invention mainly by the elements which constitute the second valve arrangement. Corresponding structural elements carry the same reference numerals as in FIG. 1, but augmented by 100.

The rod 106 has a valve portion 134 normally sealing the compartment 104 from the atmosphere by engagement with the valve seat 109. Instead of a notch 8, the valve portion 134 has two axially spaced radial bores 140, 142 which are connected by a central axial bore 141. It will be appreciated that the rod 106 must be assembled from several pieces to permit the bore arrangement 140, 141, 142, to be provided. When the rod 106 is pressed deeply into the piston rod 105 it is stopped by engagement of its end portion 107 with an abutment plate 144 mounted on an extension 143 of the piston 102 which replaces the spring cage 38. In the depressed position of the rod 106, fluid may flow from the compartment 104 through bores 116, in the piston 102 and bores in the sleeve 117 and the bores 140, 141, 142 into the bore 115 of the piston rod 105.

The lower compartment 103 is axially divided by a partition or floating sealing piston 145 into two portions respectively adjacent and remote from the piston 102. The adjacent portion of the compartment 103 and the compartment 104 are completely filled with an incompressible liquid such as hydraulic transmission or brake fluid, while the remote or lower portion of the compartment 103 is filled with a gas, preferably air or nitrogen, under high pressure.

The apparatus of FIG. 2 operates substantially in the same manner as described above with reference to FIG. 1. The compressed gas cushion under the partition 145 tends to push liquid from the compartment 103 into the compartment 104, or from the latter out of the cylinder through the bore 115, depending on the position of the rod 106.

FIG. 3 shows a modification of the apparatus of FIG. 1 which is equally applicable to the device shown in FIG. 2. The notch 8 is replaced by a bore 246 which passes through the second valve portion 234 of the rod 6, not otherwise shown, at an angle of 45° to the rod axis. When the rod is fully depressed, the lower orifice of the bore 246 communicates with the chamber 37 while the upper orifice is located in the oversized bore 15 of the piston rod 5. The bore 246 thus bridges or bypasses the the valve seat 9.

The columns of the invention may be inverted without other modification. A table top may thus be supported on the plug 30 while a suitable foot element (not shown) is threaddedly attached to the projecting end of the piston rod 5 and rests on the ground. Gravity is not relied upon in the operation of the illustrated devices. The three valve arrangements respectively shown in FIGS. 1 to 3 for releasing fluid from the column are interchangeable. Thus, the gas-cushion shown in FIG. 2 may be supplied in the column shown in FIG. 1 without otherwise modifying the device. If it is satisfactory to move the valve operating member 6' manually in both axial directions, the spring 14 may be dispensed with in the apparatus of FIG. 1.

What is claimed is:

1. In a column of adjustable height including a cylinder member having an axis and defining a cavity normally sealed from an ambient atmosphere, a piston member axially movable in said cavity and axially dividing the same into a first and a second compartment, a piston rod attached to said piston member and extending therefrom axially through said first compartment and outward of said cavity in sealing engagement with said cylinder member, said piston rod being formed with an axially elongated bore having an orifice axially directed to the ambient atmosphere in the portion of said piston rod outside said cavity, an operating member axially movable in said bore inward and outward of said orifice, and first valve means connected to said operating member for movement by said operating member between respective positions in which said valve means connects said compartments and seals the compartments from each other when said operating member moves in said bore between first and second axial positions thereof, the improvement which comprises:

second valve means operatively interposed between one of said compartments and said atmosphere, said operating member and said second valve means being operatively connected for opening said second valve means when said operating member moves axially in said bore from said second position away from said first position to a third axial position and for thereby opening said one compartment to the atmosphere, and for closing said second valve means when said operating member moves from said third position to the second position thereof.

2. In a column as set forth in claim 1, said first valve means being closed when said operating member is in said first position thereof, and being open when said operating member is in said second position thereof.

3. In a column as set forth in claim 2, releasable blocking means for normally blocking movement of said operating member from said second into said third position thereof.

4. In a column as set forth in claim 3, said blocking means including two cooperating abutments, normally fastened to said operating member and to said piston rod respectively, one of said abutments being releasably fastened.

5. In a column as set forth in claim 2, said first and second valve means including respective first and second valve members secured to said operating member for axial movement therewith, and respective first and second valve seats fixedly secured to said piston rod, said first and second valve members being axially offset relative to each other, and said first and second valve seats being axially spaced from each other.

6. In a column as set forth in claim 5, said valve seats axially defining therebetween a chamber, said first valve means being operatively interposed between said chamber and said second compartment, and said second valve means being operatively interposed between said chamber and said orifice.

7. In a column as set forth in claim 6, said chamber permanently communicating with said first compartment.

8. In a column as set forth in claim 5, said second valve member being of generally cylindrical shape, and said second valve seat being annular and coaxially receiving said second valve member therein in the closed position of the second valve means, the second valve member being formed with a recess therein of sufficient axial length to bridge said second valve seat.

9. In a column as set forth in claim 8, said recess having two bore portions extending radially in said second valve member and being axially spaced, and an axial portion connecting said bore portions.

10. In a column as set forth in claim 8, said recess extending through said second valve member obliquely to the axis of said second valve member so as to have two axially offset orifices.

11. In a column as set forth in claim 2, yieldable resilient means biasing said operating member toward said first position.

12. In a column as set forth in claim 2, a gas under a pressure substantially higher than atmospheric pressure filling a portion of one of said compartments axially remote from said piston member, the remainder of said one compartment and the other one of said compartments being substantially completely filled by a liquid.

13. In a column as set forth in claim 2, said operating member moving from said first toward said second and third positions thereof in a direction inward of said orifice.

* * * * *

UNITED STATES PATENT OFFICE
CERTIFICATE OF CORRECTION

Patent No. 3,828,651　　　　　　　　　Dated August 13, 1974

Inventor(s) NIKOLAUS DORNER ET AL

It is certified that error appears in the above-identified patent and that said Letters Patent are hereby corrected as shown below:

In the heading, after line [21] insert --

[30] Foreign Application Priority Data

Nov. 30, 1967　　Germany ............. P 16 25 465.2　　--

Signed and sealed this 26th day of November 1974.

(SEAL)
Attest:

McCOY M. GIBSON JR.　　　　　　　C. MARSHALL DANN
Attesting Officer　　　　　　　　Commissioner of Patents